United States Patent
Harada et al.

(10) Patent No.: US 11,002,230 B2
(45) Date of Patent: *May 11, 2021

(54) AIR CLEANER

(71) Applicant: TOYOTA JIDOSHA KABUSHIKI KAISHA, Toyota (JP)

(72) Inventors: Akira Harada, Anjo (JP); Shunsuke Rikitake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

This patent is subject to a terminal disclaimer.

(21) Appl. No.: 15/970,978

(22) Filed: May 4, 2018

(65) Prior Publication Data
US 2018/0347523 A1 Dec. 6, 2018

(30) Foreign Application Priority Data
Jun. 2, 2017 (JP) .............................. JP2017-110365

(51) Int. Cl.
*F02M 35/10* (2006.01)
*F02M 35/04* (2006.01)
(Continued)

(52) U.S. Cl.
CPC .... *F02M 35/10262* (2013.01); *F02M 35/024* (2013.01); *F02M 35/0207* (2013.01); *F02M 35/044* (2013.01); *F02M 35/048* (2013.01)

(58) Field of Classification Search
CPC .. B01D 2279/60; B01D 46/444; B01D 46/10; B01D 2279/06; F02M 35/024;
(Continued)

(56) References Cited

U.S. PATENT DOCUMENTS 6,185,998 B1* 2/2001 Yonezawa ............ F02M 35/021
  73/114.34
6,336,361 B1* 1/2002 Uramachi ............... G01F 1/684
  73/202.5
(Continued)

FOREIGN PATENT DOCUMENTS

JP  2000-303921    10/2000
JP  2007-155435 A   6/2007
(Continued)

OTHER PUBLICATIONS

U.S. Office Action dated Mar. 25, 2020, in corresponding U.S. Appl. No. 15/970,966, 31 pages.
(Continued)

*Primary Examiner* — Robert Clemente
(74) *Attorney, Agent, or Firm* — Oblon, McClelland, Maier & Neustadt, L.L.P.

(57) ABSTRACT

There is provided an air cleaner including: an outlet pipe through which air is discharged; an airflow meter that is inserted toward an interior of the outlet pipe through a wall of the outlet pipe; and a flow-regulating member that is formed projecting from an inner surface of the outlet pipe at a side of the airflow meter, the flow-regulating member including an edge that is formed with a peaked shape with respect to the inner surface and that runs along a direction of flow of air, a rear end that is formed at a downstream end of the edge in the direction of flow, and that is shaped cut sharply toward the inner surface and a width-narrowing portion that decreases in width in a circumferential direction of the outlet pipe on progression downstream in the direction of flow.

8 Claims, 11 Drawing Sheets

(51) Int. Cl.
*F02M 35/024* (2006.01)
*F02M 35/02* (2006.01)

(58) Field of Classification Search
CPC ......... F02M 35/10262; F02M 35/1211; F02M 35/1216; F02M 35/0205; F02M 35/021
See application file for complete search history.

(56) References Cited

U.S. PATENT DOCUMENTS

| | | | |
|---|---|---|---|
| 6,871,534 B1* | 3/2005 | Hamada | F02D 41/185 73/202.5 |
| 2009/0241683 A1* | 10/2009 | Perr | F02M 35/10144 73/861 |
| 2013/0119703 A1* | 5/2013 | Fujii | B62D 35/00 296/180.5 |
| 2013/0125635 A1* | 5/2013 | Itakura | G01M 15/04 73/114.32 |
| 2016/0280287 A1 | 9/2016 | Fujii et al. | |
| 2018/0023524 A1 | 1/2018 | Rikitake et al. | |

FOREIGN PATENT DOCUMENTS

| | | | |
|---|---|---|---|
| JP | 2010-270662 A | 12/2010 | |
| JP | 2012-246933 | 12/2012 | |
| JP | 2013-108784 | 6/2013 | |
| JP | 2014-156854 A | 8/2014 | |
| JP | 2015-083459 | 4/2015 | |
| JP | 2015-209816 | 11/2015 | |
| JP | 2015209816 A * | 11/2015 | ............ F02D 35/00 |
| WO | 2011/138931 A1 | 11/2011 | |

OTHER PUBLICATIONS

U.S. Office Action issued in U.S. Appl. No. 15/970,966 dated Jul. 7, 2020.
Notice of Allowance dated Oct. 6, 2020 issued in corresponding U.S. Appl. No. 15/970,966.

* cited by examiner

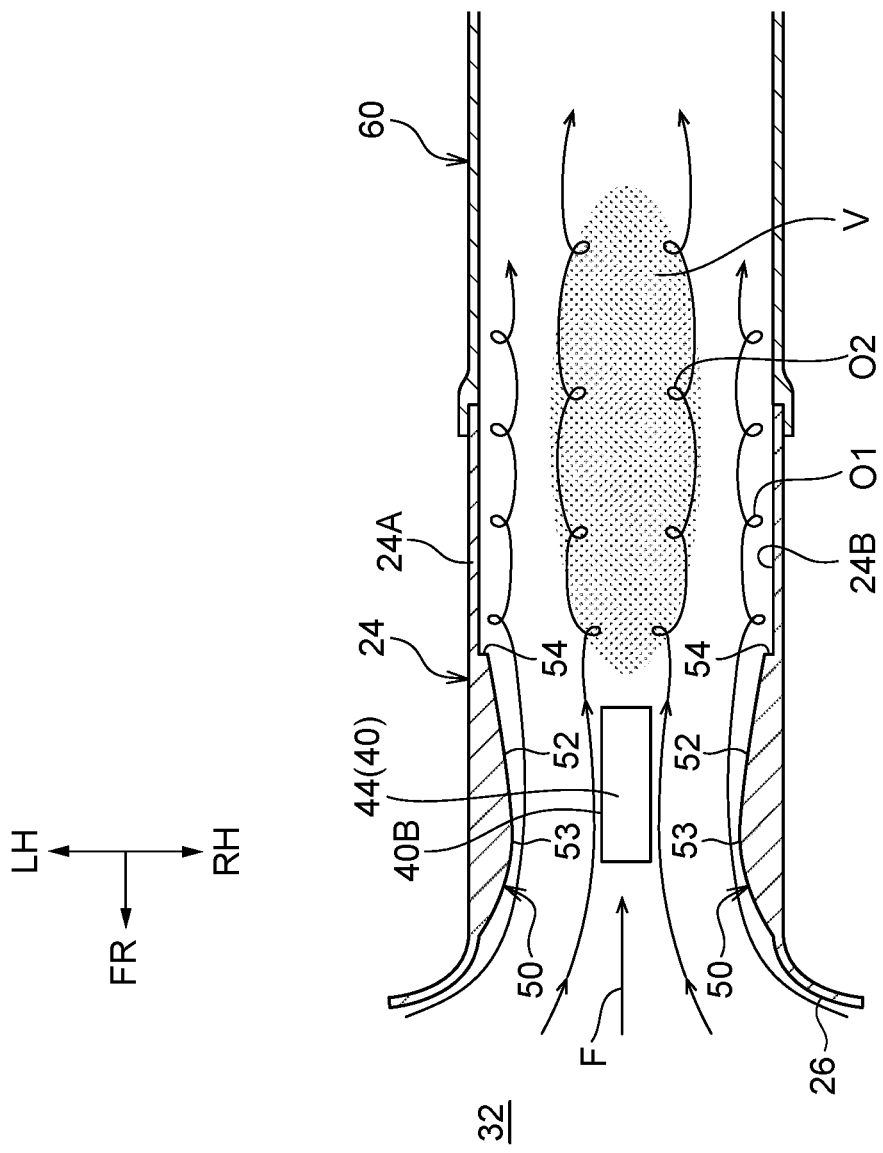

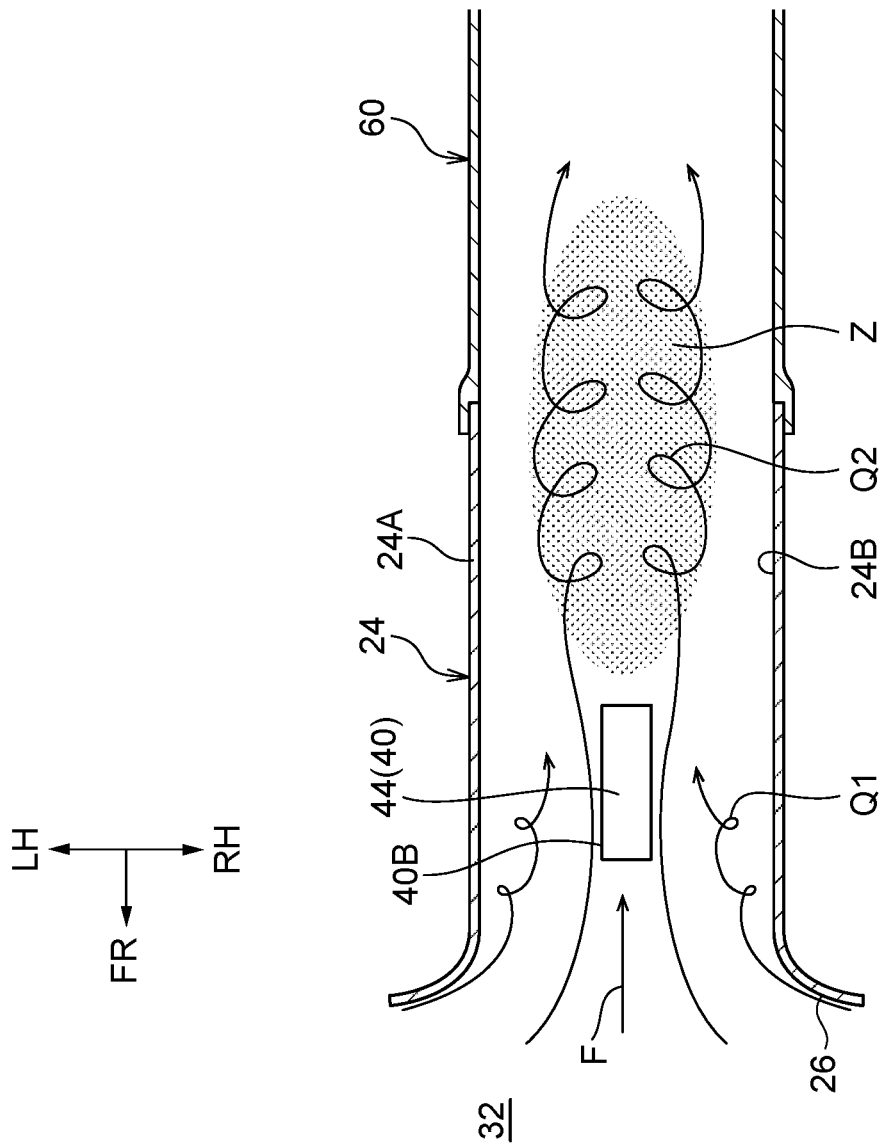

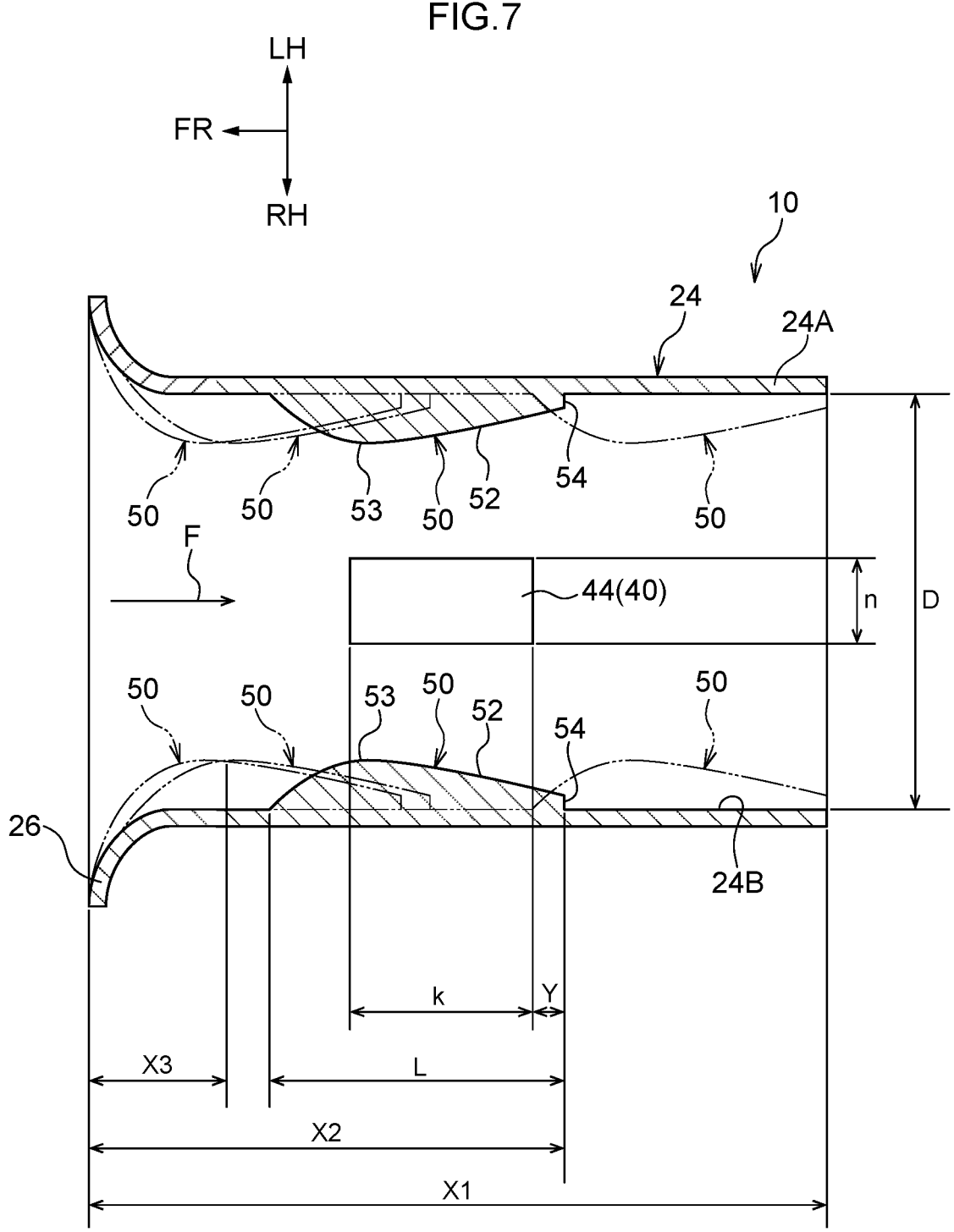

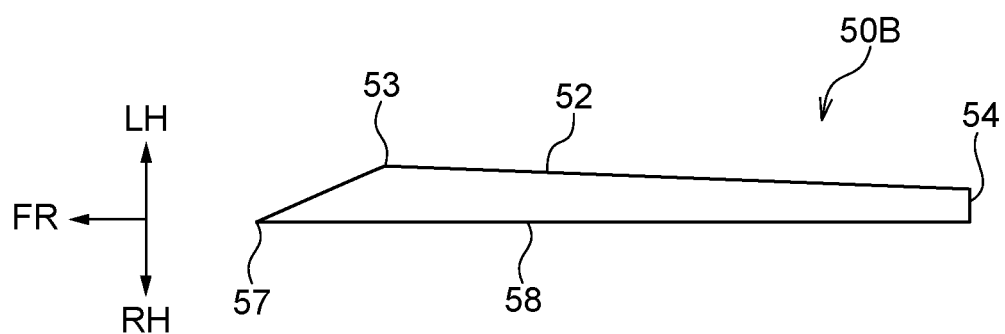
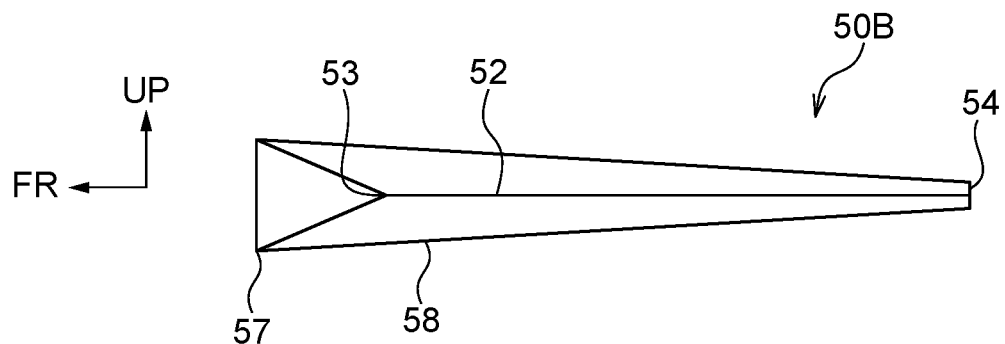

AIR CLEANER

CROSS-REFERENCE TO RELATED APPLICATION

This application is based on and claims priority under 35 USC 119 from Japanese Patent Application No. 2017-110365 filed on Jun. 2, 2017, the disclosure of which is incorporated by reference herein.

BACKGROUND

Technical Field

The present disclosure relates to an air cleaner.

Related Art

Japanese Patent Application Laid-Open (JP-A) No. 2000-303921 discloses an air cleaner. In this air cleaner, an airflow meter is inserted into an outlet pipe (air lead-out passage cylinder) integrally formed to a cap that is part of a housing that houses a filter element, and a tubular flow-regulating member is provided upstream of the airflow meter.

However, in cases in which an airflow meter projects into an outlet pipe such as in the air cleaner of JP-A 2000-303921, airflow separation and deflection is caused by the airflow meter inside the outlet pipe.

When such airflow separation and deflection occurs, airflow within the outlet pipe becomes unstable, introducing variation into the quantity of air measured by the airflow meter.

SUMMARY

In consideration of the above circumstances, an object of the present disclosure is to provide an air cleaner in which airflow separation and deflection occurring within an outlet pipe is suppressed and a stable stream of air is able to flow into an airflow meter.

An air cleaner according to a first aspect of the present disclosure includes an outlet pipe through which air is discharged, an airflow meter that is inserted toward an interior of the outlet pipe through a wall of the outlet pipe, and a flow-regulating member that is formed projecting from an inner surface of the outlet pipe at a side of the airflow meter. The flow-regulating member includes an edge that is formed with a peaked shape with respect to the inner surface and that runs along a direction of flow of air, a rear end that is formed at a downstream end of the edge in the direction of flow and that is shaped cut sharply toward the inner surface; and a width-narrowing portion that decreases in width in a circumferential direction of the outlet pipe on progression downstream in the direction of flow.

The first aspect relates to an air cleaner that includes a flow-regulating member that is formed projecting from an inner surface of an outlet pipe. An airflow meter is inserted toward an interior of the outlet pipe of the air cleaner through the surface of the wall. The airflow meter detects the quantity of air passing through the outlet pipe. A pair of flow-regulating members are provided on the inner surface of the outlet pipe at the sides of the inserted airflow meter. The flow-regulating members, when the inner surface of the outlet pipe is considered a ground plane, have a peaked shape that gradually increases in height on progression downstream in a direction of flow of air and then gradually decreases in height. A downstream end of each flow-regulating member is shaped cut sharply toward the inner surface. Further, when a circumferential direction of the outlet pipe is considered a width direction, the flow-regulating members have a width-narrowing portion that decreases in width on progression downstream in the direction of flow.

Due to the flow-regulating members being provided on the inner surface at the sides of the airflow meter in the outlet pipe, the first aspect enables orderly longitudinal vortices to be generated downstream of the flow-regulating members in the direction of flow. As a result, airflow can be made to run along the flow-regulating members. Further, the appearance of separation vortices occurring downstream of the airflow meter is able to be suppressed due to the air flowing past the sides of the airflow meter running along the inner surface within the outlet pipe. Namely, airflow separation and deflection occurring within the outlet pipe is suppressed, and so a stable stream of air flows into the airflow meter.

In an air cleaner according to a second aspect of the present disclosure, the flow-regulating member is provided within a 120° range from a position where the airflow meter is inserted as viewed in a cross-section of the outlet pipe taken orthogonally to the direction of flow.

The second aspect specifies the position of the flow-regulating member in a cross-section of the outlet pipe taken orthogonally to the direction of flow. Namely, the flow-regulating member is provided within a 120° range around the circumferential direction of the outlet pipe from the position where the airflow meter is inserted.

The second aspect suppresses airflow separation at the side of the inserted airflow meter, thereby enabling the flow of a stable stream of air into the airflow meter.

In an air cleaner according to a third aspect of the present disclosure, an apex of the peaked shape of the edge of the flow-regulating member, and a position of maximum width of the flow-regulating member in the circumferential direction of the outlet pipe, are located at an upstream side of the flow-regulating member along the direction of flow.

The third aspect allows a flow-regulating effect within the outlet pipe to be improved as a result of the flow-regulating member being given a cross-section profile resembling an airfoil, with a widened front edge and a pointed rear edge.

In an air cleaner according to a fourth aspect of the present disclosure, the outlet pipe is formed using a mold that parts in the direction of flow, and an apex of the peaked shape of the edge of the flow-regulating member is disposed so as to be positioned at a parting line of the mold for the outlet pipe.

Due to aligning the apex of the peaked shape of the flow-regulating member with the parting line of the mold for the outlet pipe, the fourth aspect enables the flow-regulating member to be integrally formed to the outlet pipe using a two-part split mold. A complex split mold for molding the flow-regulating member is thereby unnecessary, enabling manufacturing costs to be kept down.

The air cleaner of the present disclosure suppresses airflow separation and deflection occurring within an outlet pipe, thereby enabling the flow of a stable stream of air into an airflow meter.

BRIEF DESCRIPTION OF THE DRAWINGS

Exemplary embodiments of the present disclosure will be described in detail based on the following figures, wherein:

FIG. 5 is a diagram (bottom-view cross-section) explaining operation of an air cleaner of an exemplary embodiment;

FIG. 6 is a diagram (bottom-view cross-section) explaining operation of an air cleaner of a comparative example;

FIG. 7 is a diagram (bottom-view cross-section) explaining positional relationships for flow-regulating members in an outlet pipe section of an air cleaner of an exemplary embodiment;

FIG. 9A is a bottom view of a device-right flow-regulating member in an air cleaner of a second modified example of an exemplary embodiment;

FIG. 9B is a side view of a device-right flow-regulating member in an air cleaner of the second modified example of an exemplary embodiment;

DETAILED DESCRIPTION

Explanation follows regarding an air cleaner according to an exemplary embodiment of the present disclosure, with reference to FIG. 1 to FIG. 4. Note that in each the drawings, for ease of explanation, the arrow FR indicates a device front, the side opposite thereto is the device rear, and the direction running between the device front and the device rear is a device front-rear direction. The arrow UP indicates a device upper side, the side opposite thereto is the device lower side, and the direction running between the device upper side and the device lower side is a device up-down direction. Further, the arrow RH indicates a device right, the arrow LH indicates a device left, and the direction running between the device right and the device left is a device width direction. Note that the orientation of the air cleaner with respect to a vehicle body or the like is not limited by these definitions of directions.

Basic Configuration of Air Cleaner

Figure 1:
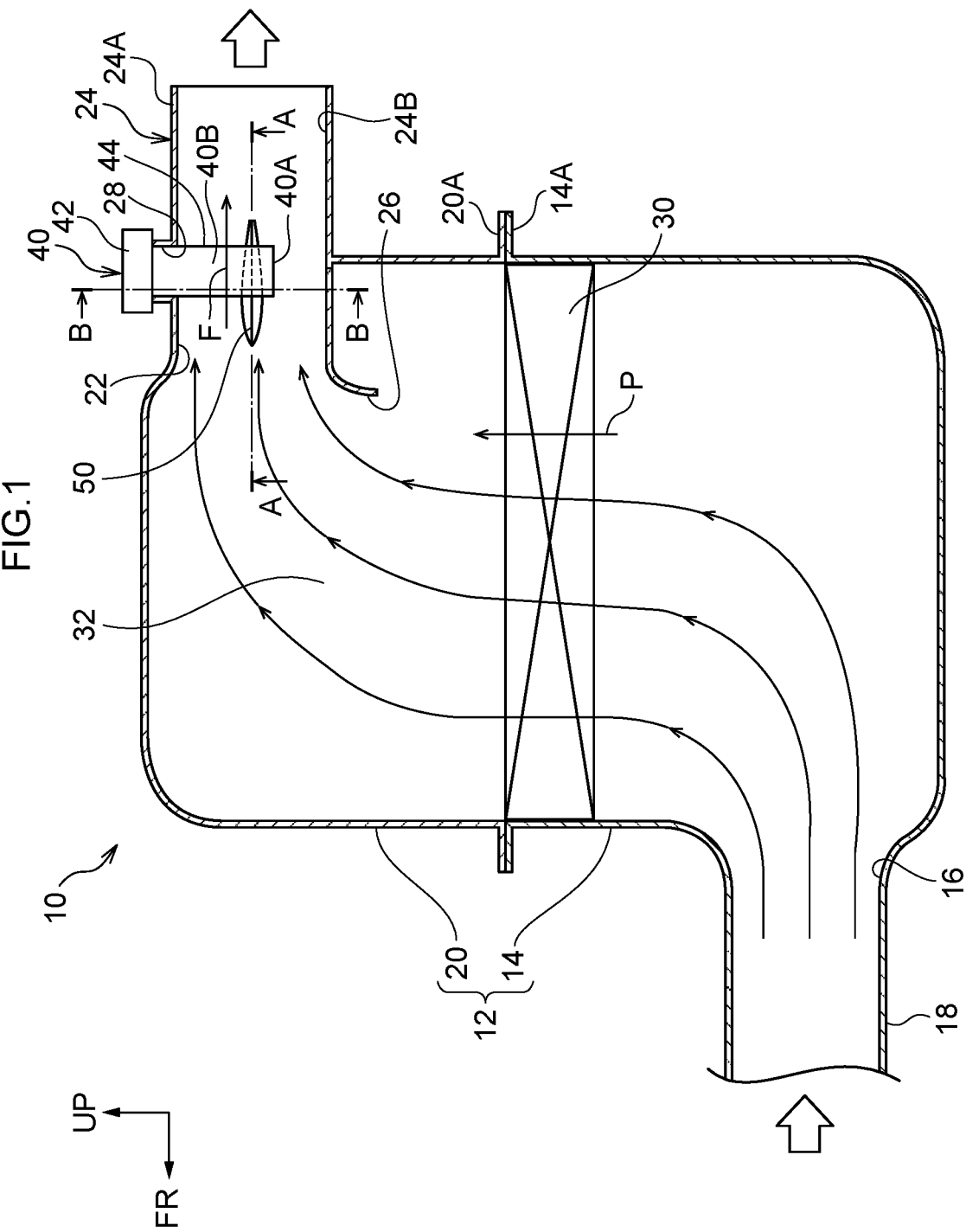
FIG. 1 is a side-view cross-section of an air cleaner of an exemplary embodiment.
Figure 2:
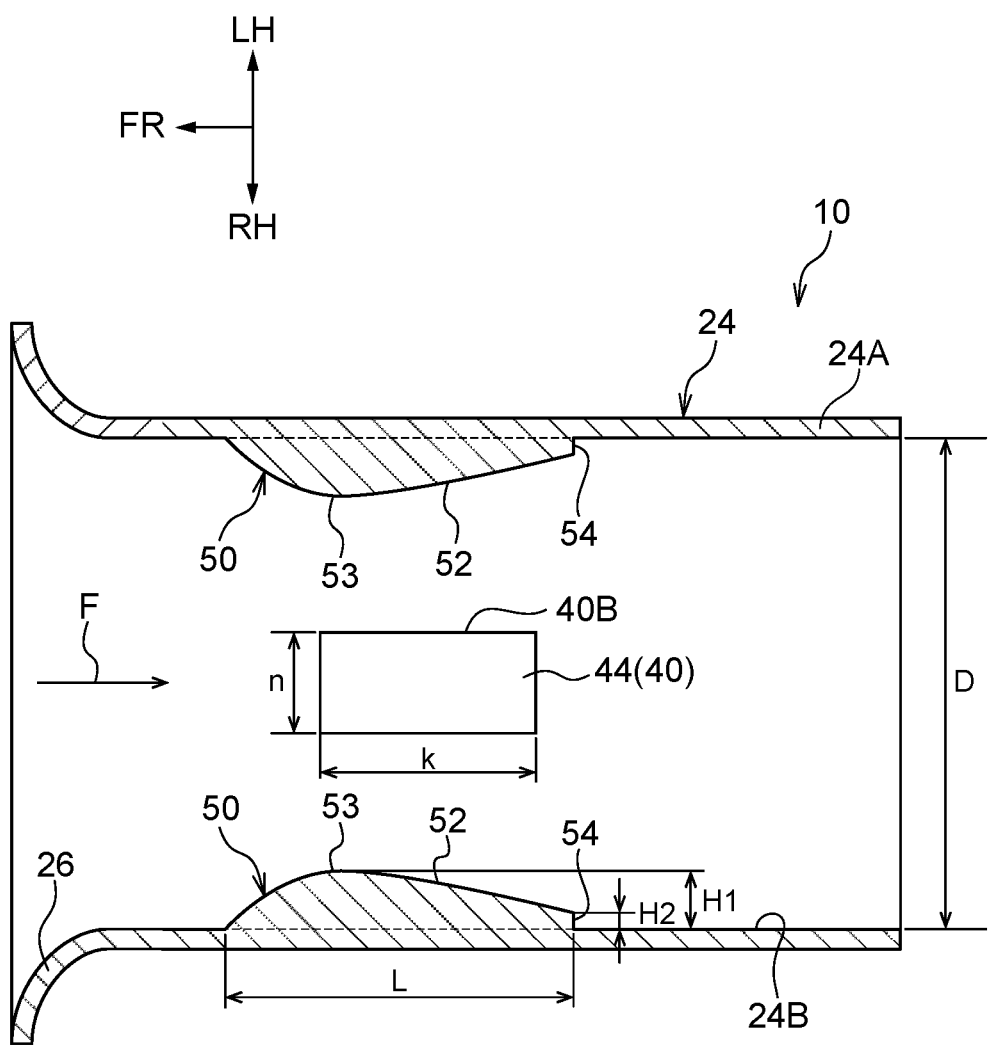
FIG. 2 is a bottom-view cross-section (a cross-section taken along A-A in FIG. 1) of an outlet pipe section of an air cleaner of an exemplary embodiment.

FIG. 1 is a vertical cross-section of an air cleaner 10 according to an exemplary embodiment, and FIG. 2 is an enlarged cross-section of an outlet pipe 24. As illustrated in FIG. 1, the air cleaner 10 is a box-type air cleaner that includes a substantially box-shaped housing 12 made of synthetic resin. The housing 12 is disposed inside the engine compartment of a vehicle and is configured including an air cleaner case 14 and a cap 20.

The air cleaner case 14 configures a lower section of the housing 12, and as seen from the outside, is formed substantially in the shape of a box that is open at the device upper side thereof. A flange 14A with an L-shaped cross-section is formed to the upper end of the air cleaner case 14 at the edge of the opening. The flange 14A is used to couple the air cleaner case 14 to the cap 20. A box-like filter element 30 is disposed so as to run along an inner wall of the opening at the upper end of the air cleaner case 14. Namely, the opening at the upper end of the air cleaner case 14 is closed off by the filter element 30.

An intake port 16 through which outside air is introduced is formed in a sidewall at the device lower side of the air cleaner case 14. An inlet pipe 18 is connected to the intake port 16. The inlet pipe 18 is a portion that introduces outside air. One end of the inlet pipe 18 is in communication with the air cleaner case 14, and another end of the inlet pipe 18 is disposed in the engine compartment.

Note that although the inlet pipe 18 of the present exemplary embodiment is integrally formed to the air cleaner case 14, there is no limitation thereto. For example, a tubular connection port may be formed projecting from a wall of the air cleaner case 14, and a separate inlet pipe inserted into the connection port so as to connect the connection port and the inlet pipe together.

The cap 20 configures an upper section of the housing 12, and a device lower side of the cap 20 is coupled to the air cleaner case 14. As seen from the outside, the cap 20 is formed substantially in the shape of a box that is open at the device lower side thereof. A flange 20A with an L-shaped cross-section is formed to the lower end of the cap 20 at the edge of the opening. The flange 20A of the cap 20 and the flange 14A of the air cleaner case 14 are coupled together by a clamp fitting (not illustrated in the drawings) or the like, in a state fitted against each another.

An air intake outlet port 22 through which clean air that has passed through the filter element 30 is discharged is formed in a sidewall at the device upper side of the cap 20. The outlet pipe 24 is connected to the air intake outlet port 22. The outlet pipe 24 is a portion that discharges clean air toward the engine. One end of the outlet pipe 24 is in communication with the cap 20, and another end of the outlet pipe 24 is coupled to a hose 60 (see FIG. 5) that extends from an engine intake manifold (not illustrated in the drawings). The inner diameter D of the outlet pipe 24 in the present exemplary embodiment is, for example, set to 60 mm (see FIG. 2). A funnel 26 is also provided in the cap 20. The diameter of the funnel 26 increases on progression from the air intake outlet port 22 toward the inside of the housing 12. In addition, a pair of flow-regulating members 50 are provided inside the outlet pipe 24 at the sides (both device width direction sides) of an airflow meter 40, described below. The flow-regulating members 50 will be described in detail later.

Note that although the outlet pipe 24 and the funnel 26 of the present exemplary embodiment are integrally formed to the cap 20, there is no limitation thereto. For example, a tubular connection port may be formed projecting from a wall of the cap 20, and a separate outlet pipe inserted into the connection port so as to connect the connection port and the outlet pipe together. Further, the outlet pipe may be passed through the wall of the cap 20, and a leading end of the passed outlet pipe inserted into a separate funnel so as to connect the outlet pipe and the funnel together. Note that the outlet pipe 24 of the present exemplary embodiment is formed using a mold that parts in the device front-rear direction. Specifically, the outlet pipe 24 is formed using a combination of a funnel 26-side mold and a pipe-side mold that excludes the funnel 26.

As described above, the air cleaner 10 of the present exemplary embodiment includes the housing 12 that houses the filter element 30. The outlet pipe 24 is connected such that a direction of passage P of air through the filter element 30 and a direction of flow F of air through the outlet pipe 24 in the housing 12 cross each other. Namely, in the present exemplary embodiment, a flow path 32 configuring a route for air curves toward the outlet pipe 24 from the filter element 30.

Figure 3:
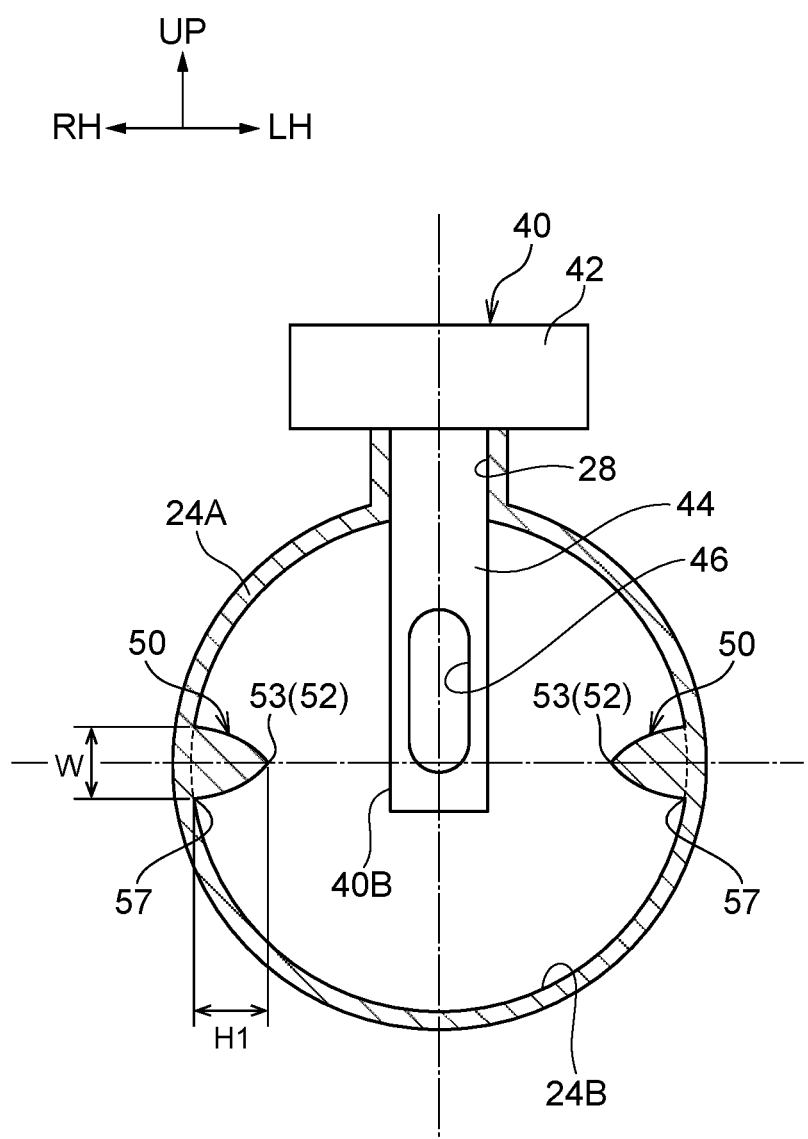
FIG. 3 is a front-view cross-section (a cross-section taken along B-B in FIG. 1) of an outlet pipe section of an air cleaner of an exemplary embodiment.

As illustrated in FIG. 1 to FIG. 3, in the present exemplary embodiment, the airflow meter 40 is inserted toward an interior of the outlet pipe 24 through a wall 24A of the outlet pipe 24. The airflow meter 40 of the present exemplary embodiment is a hot wire airflow meter. An exterior portion of the airflow meter 40 is made of resin, and the airflow meter 40 includes a substantially columnar body portion 42 and a cylindrical measurement portion 44 that extends from the body portion 42. An insertion hole 28 is provided in the wall 24A at the device upper side of the outlet pipe 24. The measurement portion 44 of the airflow meter 40 is inserted into the insertion hole 28, and the body portion 42 of the airflow meter 40 is fixed to a seat (not illustrated in the drawings) formed at the wall 24A using a bolt so as to fix the airflow meter 40 to the outlet pipe 24. Note that in the present exemplary embodiment, as illustrated in FIG. 2 and FIG. 3, the measurement portion 44 has a projection length j of 40 mm, while the inner diameter D of the outlet pipe 24 is 60 mm. Further, the device front-rear direction length k of the measurement portion 44 is 30 mm, and the device width direction width n of the measurement portion 44 is 20 mm. Although not illustrated in the drawings, the body portion 42 includes a connector used to connect to an engine control unit (ECU). Connecting a harness to the connector electrically connects the airflow meter 40 to the ECU.

As illustrated in FIG. 3, a communication port 46 is provided in the cylindrical surface of the measurement portion 44 of the airflow meter 40. A bypass flow path (not illustrated in the drawings), through which air that has entered the communication port 46 is diverted, is provided inside the measurement portion 44. A heating element (not illustrated in the drawings) for measuring a quantity of air is provided partway along the bypass flow path. In the airflow meter 40 of the present exemplary embodiment, air is passed through the communication port 46 such that the quantity of air passing through the outlet pipe 24 is measured by the ECU.

Flow-Regulating Members

As illustrated in FIG. 1 to FIG. 3, the pair of flow-regulating members 50 are formed on an inner surface 24B of the outlet pipe 24 at the sides 40B of the airflow meter 40, namely, at both device width direction sides of the airflow meter 40, so as to project toward the device width direction inside. To explain further, the flow-regulating members 50 are provided at positions 90° to the left and right of the position where the airflow meter 40 is inserted. The shape of the flow-regulating members 50 will be described in detail later. Note that in the following description, only the device-right flow-regulating member 50 of the pair of flow-regulating members 50 is described. The device-left flow-regulating member 50 is configured similarly to the device-right flow-regulating member 50 in all aspects except for being left-right inverted in the device width direction with respect thereto, and so explanation thereof will be omitted (the same applies to the first through fifth modified examples).

Figure 4A:
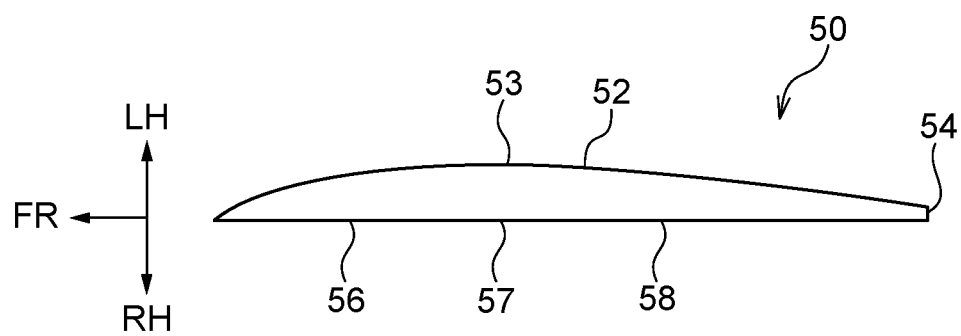
FIG. 4A is a bottom view of a device-right flow-regulating member in an air cleaner of an exemplary embodiment.
Figure 4B:
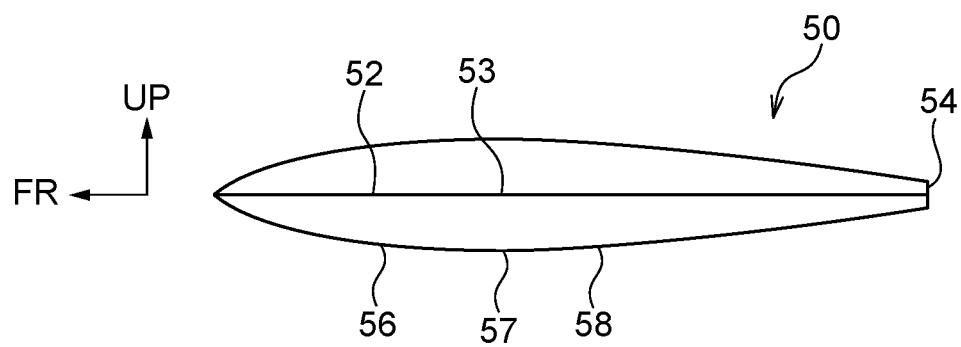
FIG. 4B is a side view of a device-right flow-regulating member in an air cleaner of an exemplary embodiment.

FIG. 4A and FIG. 4B are for explaining the shape of the flow-regulating members 50 of the present exemplary embodiment, and are external views illustrating only the device-right flow-regulating member 50. As illustrated in FIG. 4A, as seen from underneath, an edge 52 of the flow-regulating member 50 runs along the direction of flow F of air, namely, runs from the device front toward the device rear, and is formed with a peaked shape. To explain further, the height of the edge 52 from a ground plane (inner surface 24B) gradually increases until reaching an apex 53, which is the position of maximum height, and then gradually decreases, thereby forming a peaked shape. A rear end 54 of the flow-regulating member 50 is shaped perpendicularly cut sharply toward the ground plane (inner surface 24B) at the device-rear end of the edge 52. Note that in the present exemplary embodiment, the device front-rear direction length L of the flow-regulating member 50 is 50 mm, while the device front-rear direction length k of the measurement portion 44 of the airflow meter 40 is 30 mm (see FIG. 2). A height H1 at the apex 53 of the flow-regulating member 50 from the inner surface 24B is 7 mm, and a height H2 at the rear end 54 of the flow-regulating member 50 from the inner surface 24B is 3 mm (see FIG. 2).

As illustrated in FIG. 4B, as seen from the side, the flow-regulating member 50 includes a width-widening portion 56 and a width-narrowing portion 58. The width of the width-widening portion 56 along the circumferential direction of the outlet pipe 24 (the device up-down direction) increases on progression from the device front toward the device rear. The width of the width-narrowing portion 58 decreases on progression toward the device rear from the rear end of the width-widening portion 56. Note that in the present exemplary embodiment, the maximum width W of the flow-regulating member 50 in the device up-down direction is 10 mm (see FIG. 3).

Disposing the pair of flow-regulating members 50 configured as above within a stream of air generates airflow along the edges 52. This produces a flow-regulating effect within the outlet pipe 24.

In the present exemplary embodiment, in the device front-rear direction, the position of the apex 53 of the flow-regulating member 50, which is at the position of a maximum height H1 in the device width direction, is aligned with the position of a peripheral end 57 of the flow-regulating member 50, which is at the position of a maximum width W in the device up-down direction. Further, in the present exemplary embodiment, the device front-rear direction positions of the apex 53 and the peripheral end 57 of the flow-regulating member 50 are set so as to be further toward the device front than the device front-rear direction center of the flow-regulating member 50.

Due to the flow-regulating member 50 configured as above having a cross-section profile resembling an airfoil, with a widened front edge and a pointed rear edge, the flow-regulating effect within the outlet pipe 24 is able to be improved.

Operation and Advantageous Effects

In the air cleaner 10 of the present exemplary embodiment, the pair of flow-regulating members 50 are provided on the inner surface 24B inside the outlet pipe 24 at the sides (both device width direction sides) of the airflow meter 40. The outlet pipe 24 provided with the flow-regulating members 50 of the present exemplary embodiment exhibits the following operation and advantageous effects. Note that in the following explanation, comparison is made to an air cleaner of related technology (a comparative example) not provided with any flow-regulating members 50, with reference to FIG. 5 and FIG. 6.

FIG. 6 is a diagram explaining the flow of air in an outlet pipe 24 of an air cleaner 100 of related technology, this being the comparative example. Note that in the comparative example, configuration that is the same as that in the present exemplary embodiment is given the same reference numeral. As illustrated in FIG. 6, the outlet pipe 24 of the comparative example is configured the same as the present exemplary embodiment, except for that it does not include flow-regulating members 50. Namely, in the comparative example, a flow path 32 is formed curving toward the outlet pipe 24 from the filter element 30, similarly to in the present exemplary embodiment (see FIG. 1). In the flow path 32, the flow of air that passes through the filter element 30 toward the device upper side changes direction in front of the air intake outlet port 22 so as to flow toward the device rear. Air flowing along the flow path 32 converges in the funnel 26 and enters the outlet pipe 24.

In the comparative example, as a result of airflow convergence in the vicinity of the funnel 26, airflow separation occurs at the inlet of the outlet pipe 24 (see line Q1 in FIG. 6). Specifically, at the outer edge of the outlet pipe 24, the flow of air converged by the funnel 26 is not able to run along the inner surface 24B of the outlet pipe 24, causing flow separation in the vicinity of the inlet of the outlet pipe 24. Further, separation vortices are formed at the device rear of the airflow meter 40 (see line Q2 in FIG. 6). Also note that since airflow is obstructed where separation occurs (see region Z in FIG. 6), airflow deflection occurs in the outlet pipe 24. As region Z widens, the effective cross-sectional area of the outlet pipe 24 through which air passes is reduced.

Thus, in the comparative example, turbulent airflow occurs in the outlet pipe 24 due to airflow separation and deflection in the outlet pipe 24 and the reduction of the effective cross-sectional area in the outlet pipe 24 through which air passes. This causes variation in the detection of airflow by the airflow meter 40. Measurement error between the quantity of air detected by the airflow meter 40 and the quantity of air passing through the outlet pipe 24, namely the quantity of air actually flowing into the engine, causes variations in engine output and torque.

In contrast thereto, since the present exemplary embodiment is provided with the pair of flow-regulating members 50, turbulent airflow in the outlet pipe 24 such as that in the comparative example is suppressed. Detailed explanation follows with reference to FIG. 5.

First, in cases in which the flow-regulating members 50 are provided within the stream of air in the outlet pipe 24, small vortices are generated at the device rear of the flow-regulating members 50 due to the edges 52 being cut sharply at the rear end 54. Orderly longitudinal vortices are thus generated at the device rear of the flow-regulating member 50 (see line O1 in FIG. 5).

Then, the area near the inner surface 24B where the longitudinal vortices were generated is supplied with momentum from a upper layer with strong momentum toward a lower layer with weak momentum due to the longitudinal vortices arising at the device rear of the flow-regulating members 50. Thereby, the speed of airflow at the device rear of the flow-regulating members 50 increases, and air flows along the flow-regulating members 50.

Due to the flow of air along the flow-regulating members 50, the speed of airflow along the device front-rear direction of the flow-regulating members 50 also increases, and device width direction air in the outlet pipe 24 flows along the inner surface 24B. Accordingly, airflow separation at the inlet of the outlet pipe 24 is suppressed, and air in which separation has been suppressed is steered toward the airflow meter 40. The appearance and growth of separation vortices at the device rear of the airflow meter 40 is thereby suppressed (see line O2 in FIG. 5). A region that is unable to be used for flow (see region V in FIG. 5) is reduced as a result of suppressing flow separation, thereby suppressing airflow deflection in the outlet pipe 24. Namely, the effective cross-sectional area of the outlet pipe 24 through which air passes is increased.

Thus, in the present exemplary embodiment, by increasing the effective cross-sectional area through which air passes, a difference in the speeds of air flowing in the vicinity of the middle of the outlet pipe 24 and of air flowing in the vicinity of the inner surface 24B on both device width direction sides of the outlet pipe 24 is reduced. Namely, airflow within the outlet pipe 24 is made more uniform, stabilizing the flow of air. Variation in the detection of airflow by the airflow meter 40 is thereby suppressed. Variations in engine output and torque are also suppressed due to reduced measurement error between the quantity of air detected by the airflow meter 40 and the quantity of air passing through the outlet pipe 24, namely the quantity of air actually flowing into the engine. Stabilizing the airflow in the outlet pipe 24 reduces pressure loss and increases the quantity of air flowing into the engine, enabling engine output to be improved.

Device Front-Rear Direction Positions of the Flow-Regulating Members

Additional explanation will now be given regarding the device front-rear direction positions of the flow-regulating members 50, with reference to FIG. 7.

Each flow-regulating member 50 of the present exemplary embodiment is as a general rule preferably disposed so as to be contained in the entire region from the inlet to the outlet of the outlet pipe 24, namely within region X1 in FIG. 7. The reason for this is that disposing the flow-regulating members 50 in the outlet pipe 24 enables the formation of airflow that runs along the inner surface 24B at the sides where the flow-regulating members 50 are disposed. Note that in cases in which the flow-regulating members 50 are disposed at the inlet of the outlet pipe 24, the device-front portion of each edge 52 is formed so as to follow the shape of the funnel 26 and extend more toward the device width direction outside than the inner surface 24B (see the flow-regulating member 50 at the left end as illustrated using the double-dotted dashed line in FIG. 7). Namely, the edges 52 form curved lines that extend continuously from the funnel 26.

The flow-regulating members 50 are preferably disposed so as to be contained within a region X2 extending from the inlet of the outlet pipe 24 to a position to the rear of the airflow meter 40, specifically to a position a distance Y (approximately 10 mm) from the rear end of the airflow meter 40. The region X2 is preferable as this is the position where a flow-regulating effect is most strongly exhibited in the vicinity of the airflow meter 40.

Further, when the position where the segments of the mold for the outlet pipe 24 meet is set at a position a distance X3 from the inlet of the outlet pipe 24, by disposing the apex 53 of each flow-regulating member 50 so as to be located at a position corresponding to the distance X3, the position of each apex 53 is aligned with the position of the parting line of the mold for the outlet pipe 24 (corresponding to line B-B in FIG. 1). Thus aligning the apex 53 of each flow-regulating member 50 with the parting line of the mold for the outlet pipe 24 enables the flow-regulating members 50 to be integrally formed to the outlet pipe 24 using a two-part split mold. A complex split mold for molding the flow-regulating members 50 is thereby unnecessary, enabling manufacturing costs to be kept down.

MODIFIED EXAMPLES

Figure 8A:
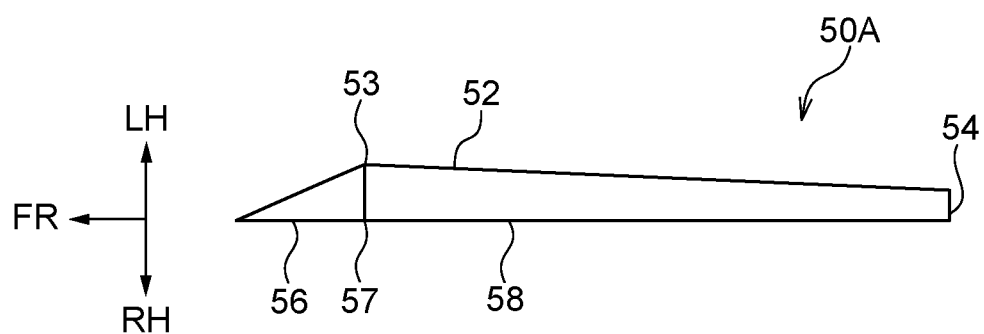
FIG. 8A is a bottom view of a device-right flow-regulating member in an air cleaner of a first modified example of an exemplary embodiment.
Figure 8B:
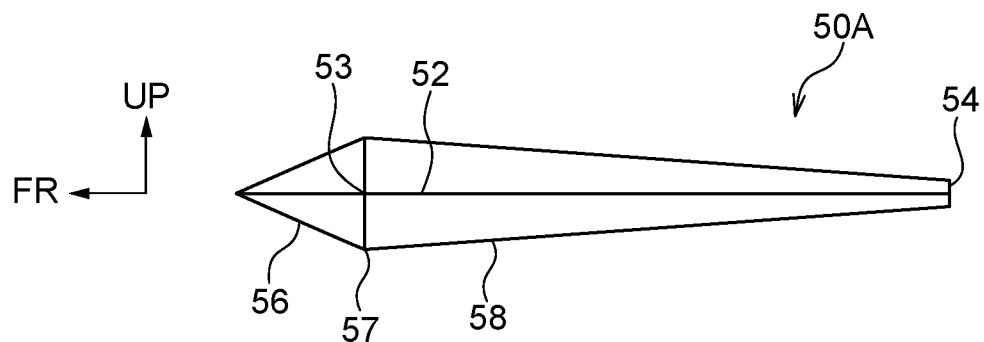
FIG. 8B is a side view of a device-right flow-regulating member in an air cleaner of the first modified example of an exemplary embodiment.

Explanation follows regarding modified examples that exhibit similar operation and advantageous effects as the exemplary embodiment, First Modified Example As illustrated in FIG. 8A and FIG. 8B, a first modified example includes a flow-regulating member 50A of a different shape than in the exemplary embodiment. Note that in FIG. 8A and FIG. 8B, configuration having the same functionality as for the flow-regulating members 50 of the exemplary embodiment is given the same reference numeral.

As illustrated in FIG. 8A, as seen from underneath, an edge 52 of the flow-regulating member 50A is formed with a peaked shape that linearly increases in height from a ground plane (inner surface 24B) and then linearly decreases in height on progression downstream in the direction of flow F of air, namely, on progression toward the device rear. Similarly to in the exemplary embodiment, a rear end 54 of the flow-regulating member 50A is shaped perpendicularly cut sharply toward the ground plane (inner surface 24B) at the device-rear end of the edge 52. As illustrated in FIG. 8B, as seen from the side, the flow-regulating member 50A includes a width-widening portion 56 and a width-narrowing portion 58. The width-widening portion 56 linearly increases in width on progression toward the device rear from the device front. The width-narrowing portion 58 linearly decreases in width on progression toward the device rear from the rear end of the width-widening portion 56.

Note that in the first modified example, in the device front-rear direction, the position of the apex 53 of the flow-regulating member 50A, which is at the position of maximum height in the device width direction, is aligned with the position of a peripheral end 57 of the flow-regulating member 50A, which is at the position of maximum width in the device up-down direction. Further, the device front-rear direction positions of the apex 53 and the peripheral end 57 of the flow-regulating member 50A are set so as to be further toward the device front than the device front-rear direction center of the flow-regulating member 50A.

Second Modified Example

As illustrated in FIG. 9A and FIG. 9B, a second modified example includes a flow-regulating member 50B of a different shape than in the exemplary embodiment. Note that in FIG. 9A and FIG. 9B, configuration having the same functionality as for the flow-regulating members 50 of the exemplary embodiment is given the same reference numeral.

As illustrated in FIG. 9A, as seen from underneath, an edge 52 of the flow-regulating member 50B is formed with a peaked shape that linearly increases in height from a ground plane (inner surface 24B) and then linearly decreases in height on progression downstream in the direction of flow F of air, namely, on progression toward the device rear. Similarly to in the exemplary embodiment, a rear end 54 of the flow-regulating member 50B is shaped perpendicularly cut sharply toward the ground plane (inner surface 24B) at the device-rear end of the edge 52. Further, as illustrated in FIG. 9B, as seen from the side, the flow-regulating member 50B includes a width-narrowing portion 58 but does not include a width-widening portion 56 such as that in the exemplary embodiment. The width-narrowing portion 58 linearly decreases in width on progression toward the device rear from the device-front end of the flow-regulating member 50B.

Note that in the second modified example, in the device front-rear direction, the position of the apex 53 of the flow-regulating member 50B, which is at the position of maximum height in the device width direction, is not aligned with the position of a peripheral end 57 of the flow-regulating member 50B, which is at the position of maximum width in the device up-down direction. Further, the device front-rear direction positions of the apex 53 and the peripheral end 57 of the flow-regulating member 50B are set so as to be further toward the device front than the device front-rear direction center of the flow-regulating member 50B (the peripheral end 57 is at the device-front end of the flow-regulating member 50B).

Third to Fifth Modified Examples

Figure 10A:
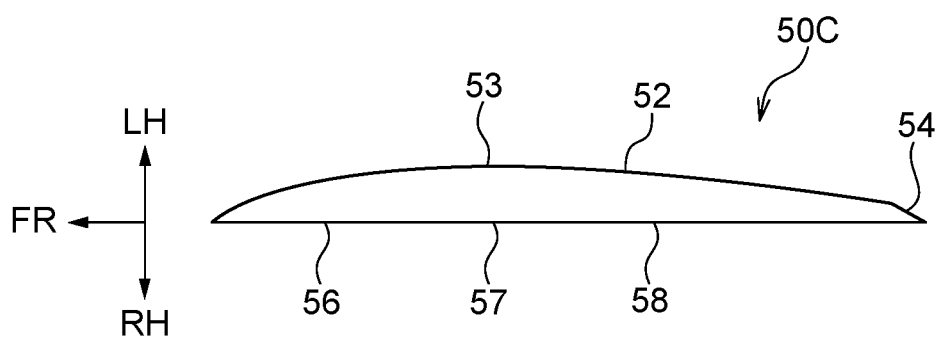
FIG. 10A is a bottom view of a device-right flow-regulating member in an air cleaner of a third modified example of an exemplary embodiment.
Figure 10B:
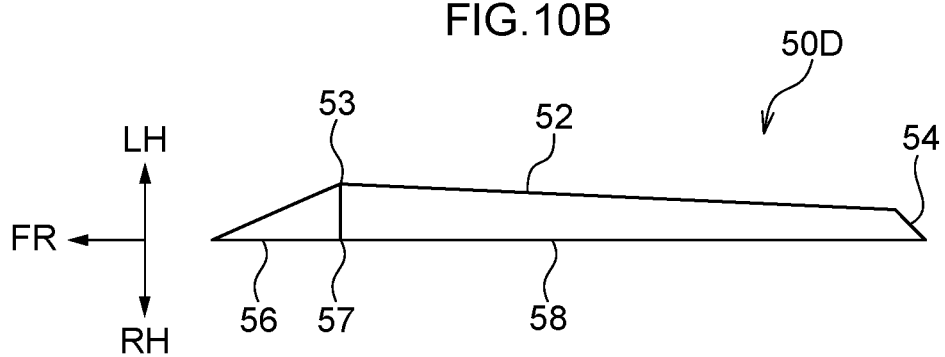
FIG. 10B is a bottom view of a device-right flow-regulating member in an air cleaner of a fourth modified example of an exemplary embodiment.
Figure 10C:
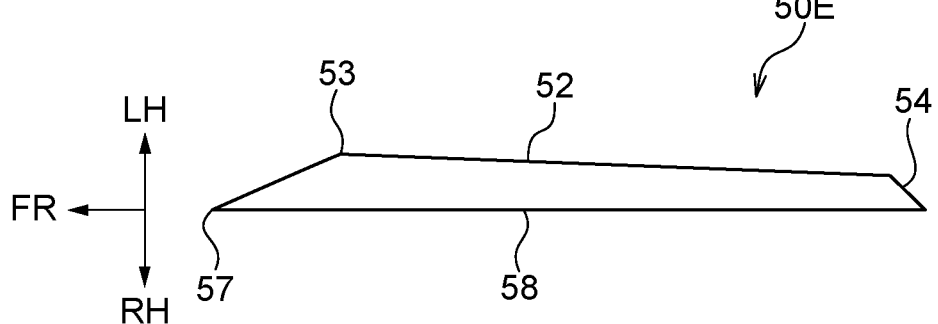
FIG. 10C is a bottom view of a device-right flow-regulating member in an air cleaner of a fifth modified example of an exemplary embodiment.

FIG. 10A to FIG. 10C illustrate additional modified examples. The rear end 54 of a flow-regulating member 50C of a third modified example illustrated in FIG. 10A differs in shape from that of the flow-regulating member 50 of the exemplary embodiment. The rear end 54 of a flow-regulating member 50D of a fourth modified example illustrated in FIG. 10B differs in shape from that of the flow-regulating member 50A of the first modified example. The rear end 54 of flow-regulating member 50E of a fifth modified example illustrated in FIG. 10C differs in shape from that of the flow-regulating member 50B of the second modified example.

Specifically, although the rear ends 54 in the exemplary embodiment, the first modified example, and the second modified example are shaped perpendicularly cut sharply toward the ground plane (inner surface 24B) at the device-rear ends of the edges 52, the rear ends 54 of the third to fifth modified examples are provided with an incline that decreases in height on progression toward the device rear.

Sixth Modified Example

Figure 11:
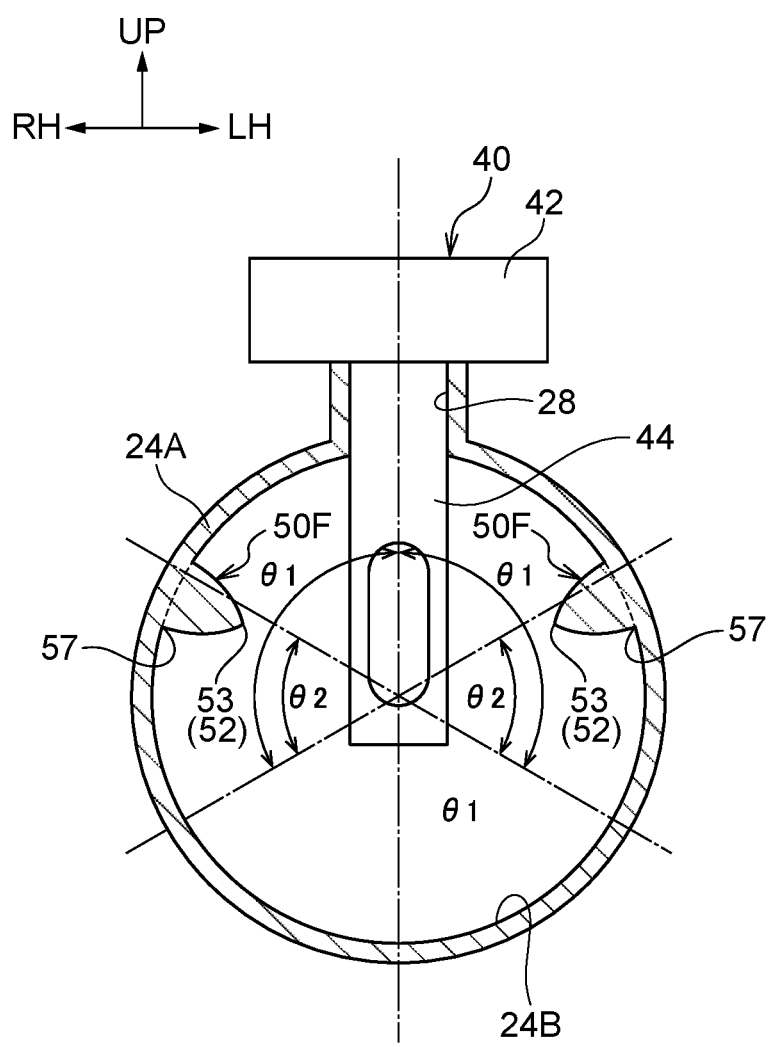
FIG. 11 is a front-view cross-section (a cross-section corresponding to FIG. 3) of an outlet pipe section of an air cleaner of a sixth modified example of an exemplary embodiment.

As illustrated in FIG. 11, the flow-regulating members 50F of a sixth modified example are provided further toward the device upper side than the flow-regulating members 50 are in the exemplary embodiment. Note that the flow-regulating members 50F have the same shape as the flow-regulating members 50 of the exemplary embodiment, and so explanation thereof is omitted.

In the sixth modified example, although flow-regulating members 50F are provided with the same shape as the flow-regulating members 50 of the exemplary embodiment, the shape of the flow-regulating members 50F is not limited thereto, and the shape of any of the flow-regulating members in the first to the fifth modified example may be adopted.

Additional explanation will now be given regarding a device width direction range for providing the flow-regulating members. As described above, an object of the exemplary embodiment and the modified examples is to suppress the separation and deflection of airflow in the device width direction. Accordingly, the pair of flow-regulating members are preferably provided within a 120° range (see angle θ1 in FIG. 11) around the circumferential direction of the outlet pipe 24 from the position where the airflow meter 40 is inserted. The pair of flow-regulating members are ideally provided within a range of from 60° to 120° (see angle θ2 in FIG. 11) therefrom. Namely, a flow-regulating effect is able to be improved as the pair of flow-regulating members approach respective device width direction ends of the outlet pipe 24 (90°).

SUMMARY OF THE EXEMPLARY EMBODIMENT

The air cleaner 10 of the exemplary embodiment possesses the following features.

A first feature is that in the exemplary embodiment, the airflow meter 40 is inserted toward an interior of the outlet pipe 24 through the wall 24A of the outlet pipe 24, and the flow-regulating members 50 are formed projecting out in the device width direction from the inner surface 24B of the outlet pipe 24 at the sides 40B of the airflow meter 40. The flow-regulating members 50 each include an edge 52 running along a direction of flow F and formed in a peaked shape, a rear end 54 that is formed at the device-rear end of the edge 52 and shaped cut sharply toward the inner surface 24B, and a width-narrowing portion 58 with a width in the device width direction that decreases on progression toward the device rear.

Due to the flow-regulating members 50 being provided on the inner surface 24B at the sides 40B (both device width direction sides) of the airflow meter 40 in the outlet pipe 24, the first feature enables orderly longitudinal vortices to be generated downstream of the flow-regulating members 50 in the direction of flow F. As a result, airflow can be made to run along the flow-regulating members 50. Airflow separation at the inlet of the outlet pipe 24 is thereby suppressed, and the appearance and growth of separation vortices at the device rear of the airflow meter 40 is suppressed.

Thus, in the exemplary embodiment, airflow separation and deflection is suppressed within the outlet pipe 24, and airflow within the outlet pipe 24 is made uniform, thereby stabilizing the flow of air. Variation in the detection of airflow by the airflow meter 40 is thereby suppressed. Variations in engine output and torque are also suppressed due to reduced measurement error between the quantity of air detected by the airflow meter 40 and the quantity of air actually flowing into the engine. Stabilizing the flow of air in the outlet pipe 24 reduces pressure loss and increases the quantity of air flowing into the engine, enabling engine output to be improved.

A second feature is that as viewed in a cross-section of the outlet pipe 24 taken orthogonally to the direction of flow F, the flow-regulating members 50 of the exemplary embodiment are provided within a 120° range from the position where the airflow meter 40 is inserted, more specifically at a 90° position.

Due the flow-regulating effect exhibited at the sides of the airflow meter 40 inserted into the center of the outlet pipe 24, the second feature suppresses airflow separation resulting from the airflow meter 40, enabling the flow of a stable stream of air into the airflow meter 40.

A third feature is that both the position of the apex 53 of each edge 52, and the position of maximum device up-down direction width of the flow-regulating members 50 of the exemplary embodiment, are located upstream in the direction of flow F.

The third feature enables the flow-regulating effect within the outlet pipe 24 to be improved as a result of the flow-regulating members 50 being given a cross-section profile resembling an airfoil, with a widened front edge and a pointed rear edge.

Note that in the exemplary embodiment, the outlet pipe 24 is formed using a mold that parts in the direction of flow F, and the apexes 53 of the peaked shapes of the edges 52 of the flow-regulating members 50 are able to disposed so as to be positioned at the parting line of the mold for the outlet pipe 24 (a fourth feature).

Due to aligning the apex 53 of each flow-regulating member 50 with the parting line of the mold for the outlet pipe 24, the fourth feature enables the flow-regulating members 50 to be integrally formed to the outlet pipe 24 using a two-part split mold. A complex split mold for molding the flow-regulating members 50 is thereby unnecessary, enabling manufacturing costs to be kept down.

Note that although a pair of flow-regulating members were provided in the exemplary embodiment and the modified examples, a flow-regulating effect is able to be obtained by, at a minimum, providing a flow-regulating member at one side of the airflow meter 40. Further, there is no limitation to a single set of left and right flow-regulating members, and two or more sets of flow-regulating members may be provided. It is also possible for an uneven number of the flow-regulating members to be provided, for example with one flow-regulating member provided on one side of the inner surface 24B, and two flow-regulating members provided on the other side of the inner surface 24B. Note that as the projected area of the flow-regulating members increases, the flow-regulating members themselves become bodies that impede air flowing through the outlet pipe 24. Accordingly, when increasing the number of flow-regulating members, an increase in the total projected area from the plural flow-regulating members with respect to the inner diameter D of the outlet pipe 24 is preferably suppressed by design whereby a dimension of each flow-regulating member is made smaller with respect to the inner diameter D of the outlet pipe 24. Further, it is not necessary for the shapes of plural sets of flow-regulating members to all be the same. For example, the shapes of any of the flow-regulating members in the first to the fifth modified examples may be adopted.

Although in the exemplary embodiment the flow-regulating members 50 are provided on the inner surface 24B of the outlet pipe 24 at the sides 40B of the airflow meter 40, an additional flow-regulating member 50 may be provided at a leading end 40A side of the airflow meter 40, namely, at the device lower side of the airflow meter 40. This is due to the following. In the exemplary embodiment, the flow path 32 is formed curving toward the outlet pipe 24 from the filter element 30 (see FIG. 1). In the flow path 32, the flow of air that passes through the filter element 30 toward the device upper side changes direction in front of the air intake outlet port 22 so as to flow toward the device rear. Air flowing through the flow path 32 converges in the funnel 26 and enters the outlet pipe 24. Namely, a device lower side of the outlet pipe 24, corresponding to the inside of the flow path 32, is the location where the flow of air abruptly changes in the vicinity of the inlet of the outlet pipe 24 (funnel 26). Thus, at the inlet of the outlet pipe 24, if airflow rises up toward the device upper side of the outlet pipe 24, corresponding to the outside of the flow path 32, airflow separation occurs and separation vortices flow into the airflow meter 40. In contrast thereto, providing a flow-regulating member 50 on the inner surface 24B at the device lower side of the outlet pipe 24 enables the suppression of separation vortices heading toward the airflow meter 40 despite the abrupt change in flow at the device lower side of the outlet pipe 24 due to the curve in the flow path 32.

Note that the respective dimensions of portions in the exemplary embodiment are merely exemplary, and these dimensions may be modified according to an amount of engine exhaust, vehicle type, etc.

What is claimed is:

1. An air cleaner comprising:

an outlet pipe through which air is discharged;

an airflow meter that is inserted toward an interior of the outlet pipe through a wall of the outlet pipe;

a flow-regulating member that is spaced apart from and faces a side of the airflow meter in a radial cross-section of the outlet pipe including the airflow meter, and that is formed projecting at an inner surface of the outlet pipe; and a funnel that is disposed at an upstream end of the outlet pipe in a direction of flow of air, the funnel increasing in diameter on progression upstream in the direction of flow, wherein the flow-regulating member is disposed downstream from the funnel in the direction of flow, the flow-regulating member including:

an edge that is formed with a peaked shape with respect to the inner surface and that runs along the direction of flow, a rear end that is formed at a downstream end of the edge in the direction of flow, and has a shape that is sharply cut toward the inner surface, and a width-narrowing portion that decreases in width in a circumferential direction of the outlet pipe on progression downstream in the direction of flow.

2. The air cleaner of claim 1, wherein:

the flow-regulating member is provided within a 120° range from a position where the airflow meter is inserted, as viewed in a cross-section of the outlet pipe taken orthogonally to the direction of flow.

3. The air cleaner of claim 1, wherein:

an apex of the peaked shape of the edge of the flow-regulating member, and a position of maximum width of the flow-regulating member in the circumferential direction of the outlet pipe, are located closer to an upstream end of the flow-regulating member than a downstream end of the flow-regulating member along the direction of flow.

4. The air cleaner of claim 1, wherein:

the outlet pipe is formed using a mold that parts in the direction of flow; and an apex of the peaked shape of the edge of the flow-regulating member is disposed at a parting line of the mold for the outlet pipe.

5. The air cleaner of claim 1, wherein the edge of the flow-regulating member forms a curved line extending continuously from the funnel.

6. The air cleaner of claim 1, wherein:

a leading end of the flow-regulating member is positioned upstream of the airflow meter in the direction of flow; and the rear end of the flow-regulating member is positioned downstream of the airflow meter in the direction of flow.

7. The air cleaner of claim 1, wherein:

the air cleaner comprises a plurality of flow-regulating members that are spaced apart from and facing the side of the airflow meter in the radial cross-section of the outlet pipe, the plurality of flow-regulating members being provided at respective ends of the inner surface orthogonal to a direction of insertion of the airflow meter as viewed in a cross-section of the outlet pipe taken orthogonally to the direction of flow.

8. The air cleaner of claim 1, wherein:

the flow-regulating member includes a width-widening portion that increases in width in the circumferential direction from an upstream end of the flow-regulating member toward a downstream end of the flow-regulating member, and the width-narrowing portion decreases in width in the circumferential direction of the outlet pipe on progression downstream in the direction of flow from a rear end of the width-widening portion.

* * * * *